Feb. 20, 1934.       J. D. WARREN       1,948,146
MOLD
Filed March 4, 1932
Fig.1.
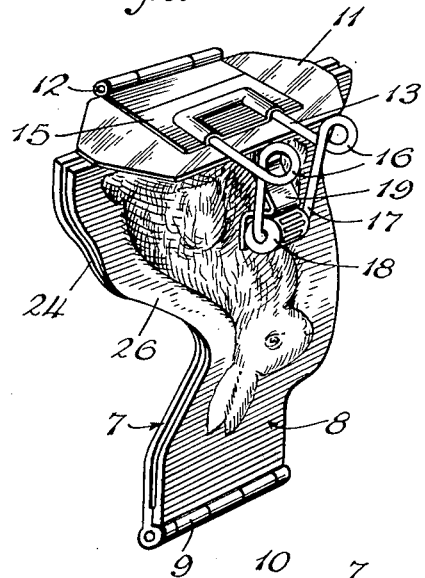
Fig.4.
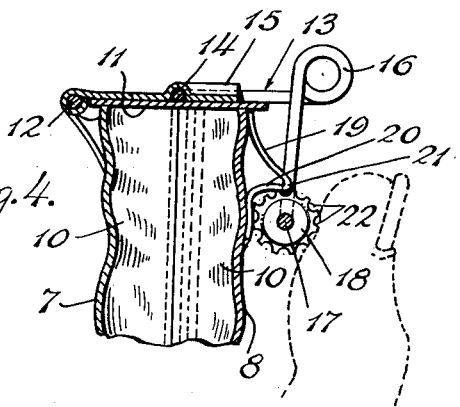
Fig.5.
Fig.6.
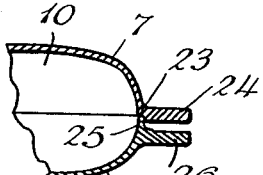
Fig.2.
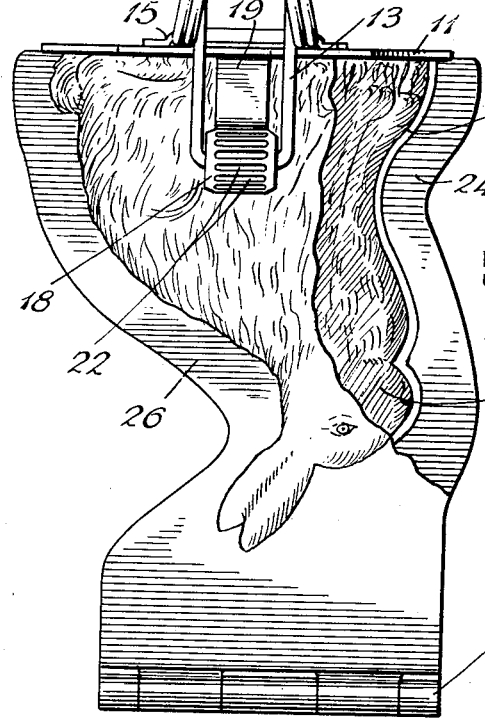
Fig.3.
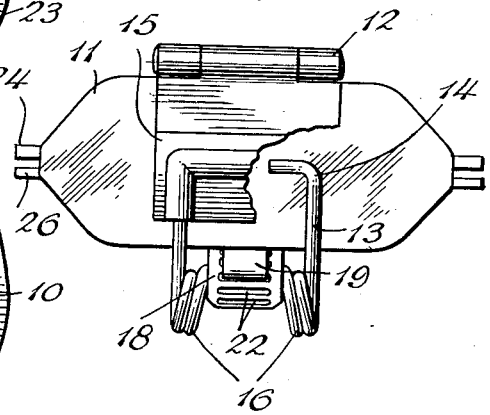
INVENTOR
JOHN D. WARREN
BY
Oscar A. Geier
ATTORNEY Patented Feb. 20, 1934

1,948,146

UNITED STATES PATENT OFFICE 1,948,146

MOLD

John D. Warren, New York, N. Y.

Application March 4, 1932. Serial No. 596,698

9 Claims. (Cl. 107—19)

This invention relates to improvements in molds and has particular reference to a mold for making hollow articles of confection such as chocolate figures or the like.

With molds of this general type which heretofore have been used in the manufacture of chocolate articles, difficulty has been experienced in tightly closing the open basal portion of the mold and in preventing the extrusion of some of the chocolate mass in the mold cavity to points between the meeting edges of the mold sections where it forms encrustations commonly known as "fins."

In accordance with the present invention, the base which is utilized to close the open end of the mold cavity, after the sections of the mold are brought together in cooperative relation, is securely connected to one of said sections by an improved latching device which will effectively prevent accidental displacement of said base when the mold is subjected to the shaking and rolling action necessary to the proper distribution of the chocolate mass in said cavity while it is being cooled and set and which will also operate to hold the sections of the mold tightly together when the same are in closed or coacting position.

The invention further proposes a unique construction of mold sections in which the meeting edges thereof are so engaged that there will be a minimum of leakage of the chocolate from the cavity of the mold with a consequent practical elimination of the formation of objectionable "fins" on the finished articles.

The inventive idea involved is capable of receiving a variety of mechanical expressions, one of which, for the purposes of illustration, is shown in the accompanying drawing wherein:—

Figure 1 is a perspective view of a mold constructed in accordance with the invention and showing the same in its operative position.

Figure 2 is an enlarged side elevation of the mold partly broken away.

Figure 3 is an end elevation showing the basal portion of the mold.

Figure 4 is a fragmentary sectional view illustrating the manner in which the thumb may be engaged with the latching device to move the same to an inoperative position.

Figure 5 is a view similar to Figure 4 showing the latching device and base of the mold in an intermediate position assumed either when the base is being opened or closed, and Figure 6 is a fragmentary transverse sectional view through the mold illustrating the manner in which the meeting edges thereof are engaged when the mold is closed.

The mold illustrated in the accompanying drawing is of the type which is usually employed in molding hollow chocolate bodies and although only a single mold is shown it will be understood that the invention is capable of use with the "gang" type of mold wherein several individual molds are assembled in one unit, as is customary in this art.

As shown, the mold comprises two coacting sections generally indicated by the numerals 7 and 8, the adjacent ends of which are pivotally connected by the hinge 9 so that the sections may be swung apart when removing the molded article therefrom. The sections are provided with complemental recesses 10 which combine to form a cavity for molding a figure of any desired shape. The cavity thus formed is open at the basal portion of the mold and said open end is adapted to be closed by a base plate 11 hinged at 12 to the section 7 of the mold.

An improved latching device is employed in connection with the base 11 for the purpose of securely maintaining the latter and the sections 7 and 8 in their closed positions while the mold is being subjected to the shocks incident to the operation of shaking and turning the mold in a machine of the general type illustrated in United States Patent #1,576,149, dated March 9, 1926. This latching device comprises a spring, generally indicated by the numeral 13, formed from a single length of resilient wire, the ends 14 of which are fastened to the outer surface of the base 11 by means of a plate 15 secured to said base in any suitable manner. Adjacent said ends the wire is bent to form the coils 16 and the medial portion of the wire is further bent to provide a substantially U-shaped bight 17 which supports a roller 18 having rotative movement thereon. On the section of the mold 8 adjacent its basal portion there is suitably secured a detent 19 in the form of a strap which is bent to provide a retaining shoulder 20 adapted to be engaged by the roller 18 when the base 11 is in its fully closed position. The relation of the parts and the action of the coils 16 of the spring are such that after a quantity of liquid chocolate is poured into the mold cavity and the base 11 is moved toward its closed position the roller 18 will initially engage and move along the inclined portion of the detent 19, and as said roller approaches the outer edge 21 of the shoulder 20 of said detent the coils 16 are contracted to place the spring under tension. Then as the surface of the roller engages said edge 20, as shown in Figure 5, the shoulder will act as a fulcrum about which said roller will move until the same passes its dead center whereupon the tensioned coils 16 will cause the roller to snap into its operative position, as shown in Figure 4. The coils will now create a pressure which is imparted to roller 18 and thence to the section 8 of the mold, which pressure will act to keep the mold sections in intimate contact with each other. In order to secure the described action of the roller, the same is preferably provided about its periphery with a series of longitudinally extending grooves 22 adapted to receive the edge 21 of the detent, as best shown in Figure 5, so as to prevent slippage of the roller and, furthermore, to constitute a milled surface adapted to be engaged by the thumb, as illustrated in Figure 4, when effecting reversal of the movement of the roller during the operation of opening the base 11. In this latter operation, which is effected by pressure of the thumb against the roller 18 and in the direction of the base 11, said roller is rocked over the edge 21 of the detent, thus again contracting the coils 16. When the roller has passed the dead center relative to said edge, the coils 16 expand and in so doing cause the roller to move down the incline of the detent and at the same time force the base 11 to fly open, so that the movement of said base to open position is automatically controlled by said coils after the roller 18 has passed the dead center previously mentioned.

Experience with molds of this character has shown that it is very difficult to prevent the extrusion from between the closed sections of the mold of more or less of the chocolate mass in the mold cavity and the resultant formation of objectionable "fins" upon the completed article, which require a separate operation for their removal. In order to overcome this difficulty the present invention provides a novel form of joint between the meeting edges of the mold sections 7 and 8, the effect of which is to reduce to a minimum the amount of the chocolate mass which may escape between said meeting edges. Said joint includes the formation of a groove 23 which borders the recess in the section 7 and which is disposed at the inner edge of the laterally extending flange 24 of said section. Said groove is adapted to receive and have seated therein the projecting tongue or ridge 25 which extends about the recess 10 in the section 8 and which is disposed at the inner edge of the lateral flange 26 of the latter section that is opposed to the flange 24. When the sections 7 and 8 are brought together as shown in Figure 6 the flanges 24 and 26 are spaced apart so that any encrustations, which may be formed upon the inner opposed surfaces of said flanges by reason of possible leakage of the liquid from within the mold cavity, will not interfere with the complete closing of the sections and proper interengagement of the tongue 25 in the groove 23 during subsequent operations with the mold, thereby eliminating the necessity of removing such encrustations after each operation. The fact that the meeting edges of the mold sections constituted by the abutting surfaces of the groove and tongue construction may thus always be brought into intimate contact will minimize to a very large extent the formation of any "fins" upon the molded article and will thus eliminate much labor in completing the article for distribution and sale.

What is claimed is:

1. In combination, mold sections coacting to form a mold cavity having an open end, a base constituting a closure for said open end, a detent carried by one of said sections, a latching device mounted on said base and including a spring, and a roller carried by said spring and actuated thereby to engage said detent to latch said base in closing position.

2. In combination, mold sections coacting to form a mold cavity having an open end, a base constituting a closure for said open end, a detent carried by one of said sections, a latching device mounted on said base and including a spring, and a roller carried by said spring and having a longitudinally grooved surface, said spring actuating said roller to engage the same with said detent to latch said base in closing position, and said detent being engageable with a groove in said roller to constitute a fulcrum therefor when unlatching said base.

3. In combination, mold sections coacting to form a mold cavity having an open end, a base constituting a closure for said open end, a detent carried by one of said sections, a spring member carried by said base, and a roller supported on said spring member and engageable with said detent for a rolling movement thereover when said base is moved to open and closed positions.

4. In combination, mold sections coacting to form a mold cavity having an open end, a base constituting a closure for said open end, a detent carried by one of said sections a spring member formed from a single length of wire having its ends secured to said base and intermediate portions thereof provided with coils and a bight portion, and a roller carried by said bight portion and rotatable over said detent when closing and opening said base.

5. In combination, mold sections coacting to form a mold cavity having an open end, a base constituting a closure for said open end, a detent carried by one of said sections, a spring member formed from a single length of wire having its ends secured to said base and intermediate portions thereof provided with coils and a bight portion, and a roller carried by said bight portion and rotatable over said detent when closing and opening said base, said roller having a groove therein for receiving an edge of said detent during the rotary movement of said roller.

6. In combination, hingedly connected mold sections coacting to form a mold cavity, a base for said sections hinged to one of them and constituting a closure for one end of said cavity, a detent carried by the other of said sections, a latching device carried by said base and including a member having a rolling movement over said detent when moving said base to open and closed positions, and a spring for yieldably maintaining said rolling member in engagement with said detent.

7. In combination, pivotally connected mold sections having recesses coacting to form a cavity therebetween, and also having flanges projecting laterally from the edges of said recesses and coextensive with the margins of the sections, one of said sections having a groove bordering the recess therein and formed in the inner edge of the flange of said section, and a tongue bordering the recess in the other section and projecting from the inner edge of the flange of the latter for engagement in said groove when the sections are moved about their pivot into coacting relation, the flanges of said sections being then spaced from each other with said tongue forming a wall of single thickness and constituting the only closure for the space between said flanges.

8. In combination, mold sections co-acting to form a mold cavity having an open end, a closure for said end, a detent, a latching device including a resilient member, and a roller actuated by the latter member to engage said detent to latch said closure in closing position.

9. In combination, mold sections co-acting to form a mold cavity having an open end, a closure for said end, a detent, a latching device including a resilient member, and a roller actuated by the latter member to engage said detent to latch said closure in closing position, said detent constituting a fulcrum for said roller during the unlatching of said closure.

JOHN D. WARREN.